No. 643,906. Patented Feb. 20, 1900.
E. A. MARSH.
SUPPLY VALVE.
(Application filed May 3, 1899.)
(No Model.)

WITNESSES
Chas. E. Winner
M. E. Kott

INVENTOR
Elon A. Marsh
By Parker & Burton
Attorneys.

UNITED STATES PATENT OFFICE.

ELON A. MARSH, OF DETROIT, MICHIGAN.

SUPPLY-VALVE.

SPECIFICATION forming part of Letters Patent No. 643,906, dated February 20, 1900.

Application filed May 3, 1899. Serial No. 715,465. (No model.)

*To all whom it may concern:*

Be it known that I, ELON A. MARSH, a citizen of the United States, residing at Detroit, county of Wayne, State of Michigan, have invented a certain new and useful Improvement in Supply-Valves; and I declare the following to be a full, clear, and exact description of the invention, such as will enable others skilled in the art to which it pertains to make and use the same, reference being had to the accompanying drawings, which form a part of this specification.

This invention relates to supply-valves for flush-tanks, and has for its object an improved form of valve arranged to be actuated by a float and to control the flow of water into a flush-tank or storage-cistern. The basic principle of operation of this valve is disclosed in my previous application for Letters Patent, filed March 10, 1899, Serial No. 708,492, which application was made for a patent on a pressure-regulating valve. The valve proper of the construction is attached to or made part of a piston that is operated to open and close by differential pressures resulting from the flow of fluids under pressure into and out of a chamber through passages of variable relative area, and the novel feature of the invention of this application is the means employed to vary the relative orificial area of the passages leading into and out of the regulating-chamber.

Figure 1:
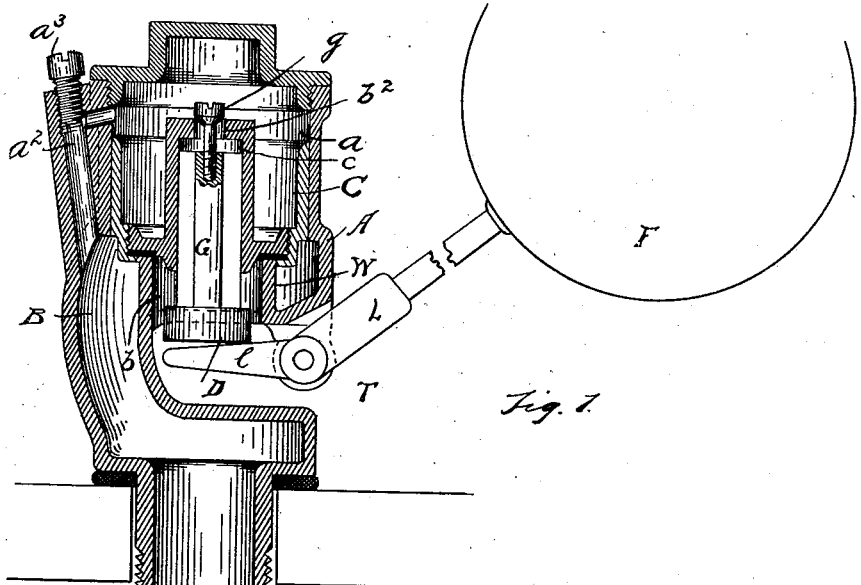
Figure 2:
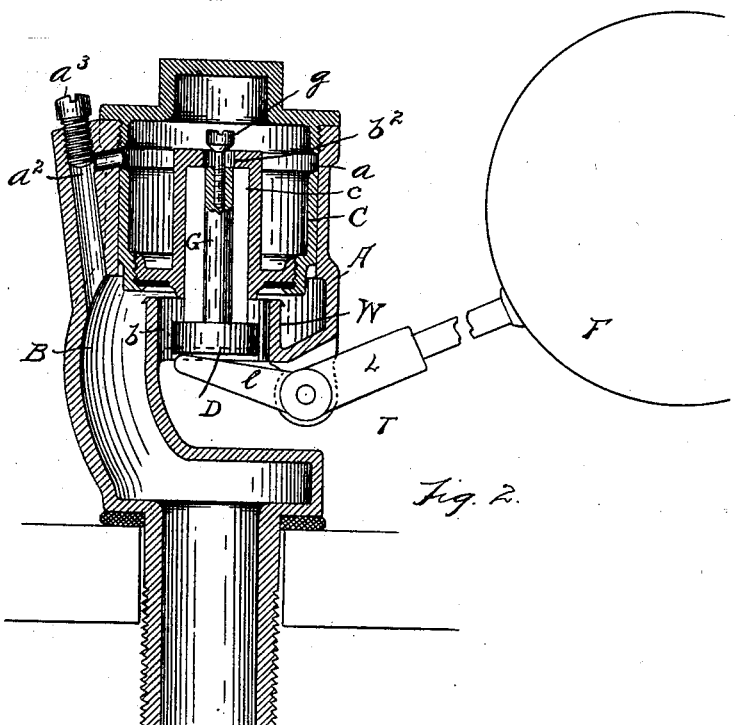

In the drawings, Figure 1 shows a valve in vertical section and closed. Fig. 2 shows the valve in vertical section and open.

A indicates the main casing of the valve.

$a$ indicates a cylindrical piston-chamber, and C indicates a piston arranged to reciprocate in the cylindrical piston-chamber $a$.

B indicates the high-pressure chamber, which is at the end of and freely communicates with the supply-pipe.

$b$ indicates the discharge orifice or passage between the high-pressure chamber B and the low-pressure chamber. The low-pressure chamber in this case is that portion of the passage $b$ which lies above the disk D.

$c$ is a tubular chamber opening downward and formed centrally in the piston C. In the tubular chamber $c$ is fitted the winged guide-stem G of a disk D, which partially fills the outlet-passage $b$. At the upper end of the tubular chamber $c$ is a small passage $b^2$, communicating with the interior of the piston-chamber $a$, and this passage is regulated by a small valve $g$, that is connected by a stem to the guide G. The valve $g$ seats downward on a seat surrounding the top of the passage $b^2$.

There is a communication between the high-pressure chamber B and the piston-chamber $a$ through a small passage $a^2$, the size of which passage-way is regulated by any suitable device that is capable of changing the dimensions of the passage—for example, the end of a screw $a^3$, which projects into the passage and varies the dimensions of the passage in proportion to the amount that is inserted into it.

The valve $g$ is arranged to be adjusted with reference to the disk D by adjusting the distance between the two. Such an adjustment may be made by making the stem of the valve $g$ a screw and inserting it in a threaded hole in the winged stem G. The disk D and the stem G and the valve $g$ are lifted by the action of a lever L, the short end $l$ of which lever bears upward against the disk D and the free end of which is provided with a float F.

The operation of the valve is as follows: When the parts are in the position shown in Fig. 1 and the piston C in its lowermost position, closing the passage $b$, the water in the high-pressure chamber bears against that part of the piston C which lies annularly outside of the wall W of the outlet-passage $b$. At the same time water passing through the passage-way $a^2$ into the piston-chamber $a$ bears against the opposite side of the piston, and as the surface exposed to the high pressure from this source is greater than the surface exposed to high pressure on the opposite side of the piston this pressure would keep the piston-valve closed; but if the tank T is empty and without water in it to support the float F the float F becomes a weight, actuates the lever L, lifts the disk D and the small valve $g$, and reduces the pressure of water in the piston-chamber $a$. If the passage leading into the piston-chamber is not too large, the auxiliary valve will properly adjust the orifice of discharge relative to the inlet-passage and there will be an overbalance of pressure on the lower side or annular part of the piston C and the piston rises, giving an open passage-way from the high-pressure chamber B directly into the tank T, opposed, however, by the disk D, which partially fills the outlet-passage $b$. The action of the flowing water, both by its pressure and momentum, acting against the disk D tends to close down the valve $g$ on its seat, and the closing of the valve $g$ on its seat diminishes or stops the flow of water from the piston-chamber $a$. The pressure of the water in the chamber $a$ rises and presses the piston-valve to its seat.

If the piston C be made to fit loosely in the cylinder, so that there is a small amount of leakage by it into the intermediate chamber, the passage $a^2$ may be omitted entirely. The small annular passage admits water sufficient to produce the proper action, and the valve readily accommodates itself to the inflow.

When the water flows through the passage $b$ into the tank T, the pressure of the water is greater above the disk D than it is below, and if the difference of pressure is sufficient, so that the pressure acting on the upper surface of the disk overcomes the weight of the float F, the disk will be pressed downward and the valve $g$ will partially close the outlet-passage from the chamber $a$, the pressure in the chamber $a$ will be increased, and the piston C forced downward to close the outlet-passage between the high-pressure chamber B and the passage $b$. When the water in acting on the float F raises the float, the disk D, no longer sustained by the weight of the float, will drop entirely down, the valve $g$ will entirely close the passage $b^2$, and the piston-valve will close. There is thus with the proper adjustment a force tending to close the main valve, counteracted by a force tending to open it. Theoretically these forces act alternately, and the valve would constantly flutter, vibrate, or reciprocate; but actually the vibration or reciprocation is so small that it is not noticeable, and there is in practice a constant flow of water, which emerges at the presented low pressure. The flow of water from the high-pressure chamber B into the tank is so restricted and its pressure is so reduced before it passes the disk D that the water emerges into the tank from the passage $b$ in a gentle stream at low pressure and without noise or other objectionable features. On the other hand, the closing of the valve is so gentle and gradual that the objectionable feature of water-hammer is entirely avoided.

What I claim is—

1. In a supply-valve for water-tanks, in combination with a casing, a piston and piston-chamber adapted to be actuated by differential pressure therein, a valve upon said piston, passages of variable relative area leading from the high-pressure side into said piston-chamber, and from said piston-chamber to the low-pressure side of the piston, a retarding mechanism in the outlet-passage, a float mechanism arranged to actuate the retarding mechanism, and a valve in the passage from the piston-chamber to the low-pressure side of the piston, the stem of said valve being connected to the retarding mechanism, and the valve and the retarding mechanism being regulated to limit the pressure of the water passing the retarding mechanism, substantially as described.

2. In a supply-valve operating to regulate the flow of water into a tank by a valve attached to a piston, the combination of a cylinder, and a piston arranged to be reciprocated therein by differential pressure, a valve upon said piston, passages of differential area leading from the high-pressure side into the piston-chamber, and from the piston-chamber to the low-pressure side, and means actuated by a float and by the passage of the water to regulate the relative area of said passages, substantially as described.

3. In a supply-valve, in combination with a casing inclosing a high-pressure chamber, a low-pressure chamber, and an intermediate chamber, and provided with a passage between the high-pressure chamber, and the low-pressure chamber, a passage between the high-pressure chamber and the intermediate chamber, and a passage between the intermediate chamber and the low-pressure chamber, a piston-valve arranged to be actuated by differential pressure and control the main passage, a disk partially closing the outlet from the low-pressure chamber, a valve arranged to be actuated simultaneously with said disk and arranged to control the passage-way leading from the intermediate chamber to the low-pressure chamber, substantially as described.

4. In a supply-valve for water-tanks, in combination with a casing, a piston and a piston-chamber adapted to be actuated by differential pressure therein, a valve upon said piston, passages of variable relative area leading from the high-pressure side into said piston-chamber, and from said piston-chamber to the low-pressure side of the piston, a retarding mechanism in the outlet-passage, a float mechanism arranged to actuate the retarding mechanism, and a valve in the passage from the piston-chamber to the low-pressure side of the piston, the stem of said valve being connected to the retarding mechanism, and the valve and the retarding mechanism being regulated to limit the pressure of the water passing the retarding mechanism, substantially as described.

5. In a supply-valve, in combination with a casing inclosing a high-pressure chamber, an intermediate chamber and a low-pressure chamber, and provided with a passage between the high-pressure chamber and the low-pressure chamber, and with a passage between the intermediate chamber and the low-pressure chamber, a piston-valve arranged to be actuated by differential pressure, and to control the main passage, a disk partially closing the outlet from the low-pressure chamber, a valve arranged to be actuated simultaneously with said disk, and arranged to control the passage-way leading from the intermediate chamber to the low-pressure chamber, and a float adapted to actuate said disk, substantially as described.

6. In a supply-valve for water-tanks, in combination with a casing provided with an inlet-orifice, and a high-pressure chamber at the inlet-orifice, an outlet-orifice, and a low-pressure chamber at the outlet-orifice, a retarding mechanism in the outlet-orifice, an intermediate chamber of variable capacity formed by a piston-chamber and a piston arranged to be reciprocated therein by differential pressure, a valve connected with said piston arranged to open and close the direct passage between the high-pressure chamber and the low-pressure chamber, a passage from the high-pressure chamber into the intermediate chamber, and a valve-closed passage from the intermediate chamber into the low-pressure chamber, a valve closing said passage adapted to be operated by said retarding mechanism, and a float arranged to actuate the valve in the passage leading from the intermediate chamber to the low-pressure chamber, substantially as described.

In testimony whereof I sign this specification in the presence of two witnesses.

ELON A. MARSH.

Witnesses:
   JOHN N. GOODRICH,
   CHARLES F. BURTON.